May 5, 1931.  F. SCHAEFER  1,804,119
BRAKE HANGER SUPPORT
Filed Nov. 12, 1928
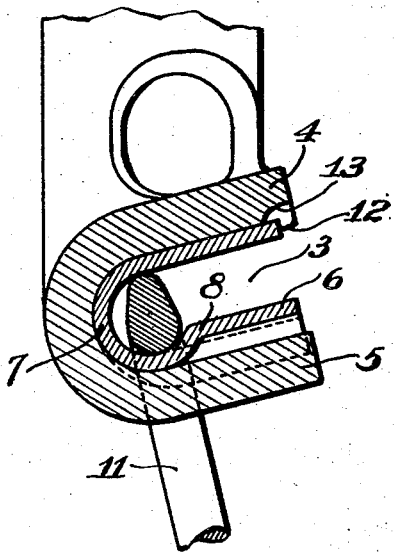
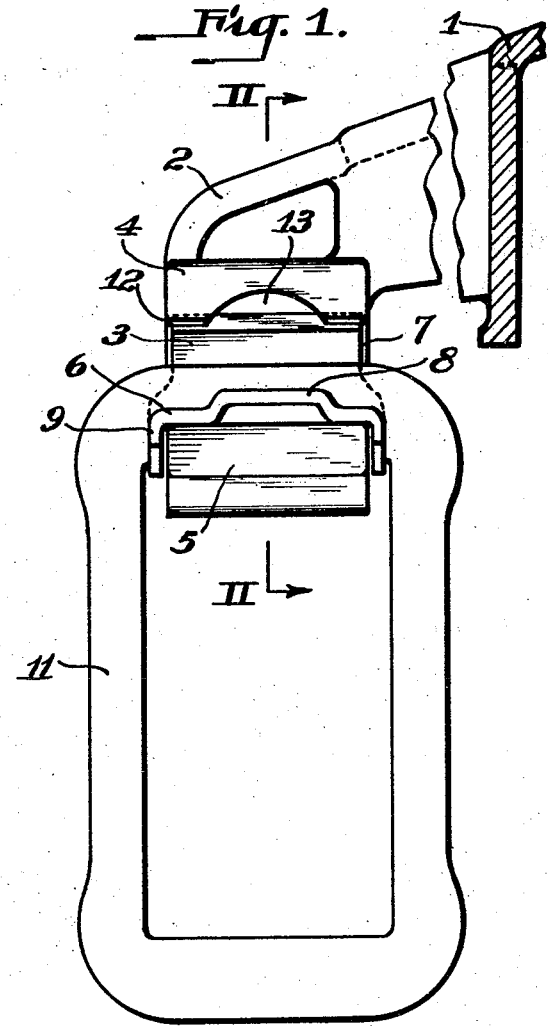
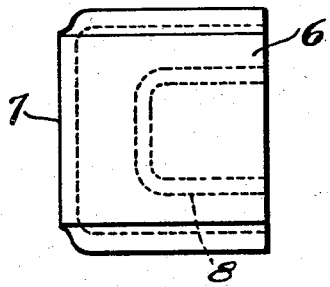
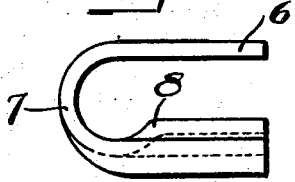
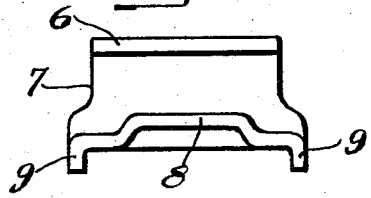
WITNESS
O.B.Wallock.
INVENTOR
Frederic Schaefer
By Brown & Critchlow
his Attorneys.

Patented May 5, 1931

1,804,119

UNITED STATES PATENT OFFICE

FREDERIC SCHAEFER, OF PITTSBURGH, PENNSYLVANIA

BRAKE HANGER SUPPORT

Application filed November 12, 1928. Serial No. 318,890.

The invention relates to the attachment of brake hangers to the side frames of railway car trucks, and especially to means for decreasing wear on the hangers and their supports, the object being to provide a brake hanger support with a simple and effective wear-resisting bushing for receiving the upper portion of a brake hanger, which bushing may be easily applied to and removed from the support.

The invention is illustrated in the accompanying drawings of which Fig. 1 is a transverse vertical section of the upper cord of a truck frame having a brake hanger supporting bracket attached to it which is shown in elevation together with a brake hanger; Fig. 2 a vertical sectional view of the brake hanger support taken on the line II—II of Fig. 1; and Figs. 3, 4 and 5 are a top plan view, a side elevation and a front elevation, respectively, of the wear-resisting bushing disposed in the brake hanger support.

According to this invention a truck frame is provided with a bracket having an open ended horizontally disposed slot to receive the upper yoke of a continuous or loop brake hanger, or the connecting pin of a U-shaped hanger. Within the slot formed by the bracket there is arranged a removable bushing of resilient wear-resisting metal which conforms to and presses yieldingly against the walls of the slot, and, like the slot, is open ended to receive a brake hanger. Intermediate of its ends the bushing is preferably provided with an inwardly extending portion which permits the application of a brake hanger, especially a brake hanger having an upper yoke which is elongate in transverse cross section, and which serves to lock the hanger in operative position when the bushing is placed in a bracket slot and the hanger turned downwardly. Provision is made for attaching the bushing to the bracket by simply snapping it into place, and to such end the bushing and the wall of the slot are provided with cooperating detents which may be of various forms, but which preferably consist of an inwardly extending projection at the end of the slot, which projection engages the outer end of the bushing. While the bushing may be formed of various resilient wear-resisting metals, it is preferably formed of a hard or hardened steel plate which may be pressed, forged or otherwise formed into the required shape.

Having reference to the illustrative embodiment of the invention, a truck frame 1 is shown as being provided at its side with a laterally extending bracket 2, the lower end of which is provided with an upwardly inclined, but nevertheless horizontally disposed, slot 3 formed between upper and lower projecting walls 4 and 5 of the bracket. Within the slot there is arranged a bushing 6 of resilient wear-resisting metal shaped to conform to, and press yieldingly against, the walls of the slot. At its inner end 7 the bushing is of general cylindrical shape to form a bearing for the upper yoke or pin of a brake hanger, and intermediate of its ends the bushing is provided with inwardly pressed projections 8 for narrowing the slot for the purpose previously explained. As shown in the drawings, the edges of the bushing may be provided with flanges 9 arranged adjacent to the side walls of the bracket for holding the bushing against lateral displacement.

Within the slot formed by the bushing there is shown a brake hanger 11 of the loop or closed link type. The upper and lower yokes or transverse arms of the hanger are elongate in transverse section, and may be of the asymmetric I-beam form disclosed in my United States Patent No. 1,470,121. The brake hanger is indicated in Fig. 2 in its operative beam-supporting position in which it is held by inwardly extending bushing projection 8.

As shown in Figs. 1 and 2 the upper slot-forming wall 4 of the bracket is provided at its outer end with a bushing-engaging detent in the form of a downwardly extending lip 12 which partially closes the outer end of the slot. This lip engages the outer end of the bushing and retains it in place when it has been snapped into the slot. To provide for removing the bushing when it has become worn, or for any other reason its removal is desired, an opening or groove 13 is formed in the lower face of the outer end of wall 4 of the bracket into which groove a tool or bar may be inserted to force the upper portion of bushing 6 downwardly sufficiently to permit it to pass the lower edge of lip 12 while removing the bushing. While in the particular illustration shown the means for retaining the bushing in place is formed upon the outer end of the upper slot forming wall of the bracket, it will be understood that the same result may be accomplished in other ways, and that other ways may be provided for removing the bushing.

According to the provisions of the patent statutes, I have explained the principle and operation of my invention and have illustrated and described what I now consider to represent its best embodiment. However, I desire to have it understood that, within the scope of the appended claim, the invention may be practiced otherwise than as specifically shown and described.

I claim as my invention:

The combination of a truck frame for railway cars provided with a bracket having an open ended slot for receiving a brake hanger, and a substantially U-shaped bushing of resilient wear-resisting metal adapted to be fitted in said slot with its sides pressing yieldingly against the walls of the slot and forming a bearing for a brake hanger, a portion of said bracket extending inwardly into said slot for engaging said bushing to hold it in place, and a recess formed in said bracket adjacent said inwardly extending portion and into which a tool may be inserted for removing the bushing.

In testimony whereof, I sign my name.

FREDERIC SCHAEFER.